Sept. 26, 1933.　　　A. J. VASSELLI　　　1,928,143
AUTOMATIC POWER CLUTCH AND BRAKE CONTROL FOR VEHICLES
Filed Feb. 8, 1932　　　5 Sheets-Sheet 1
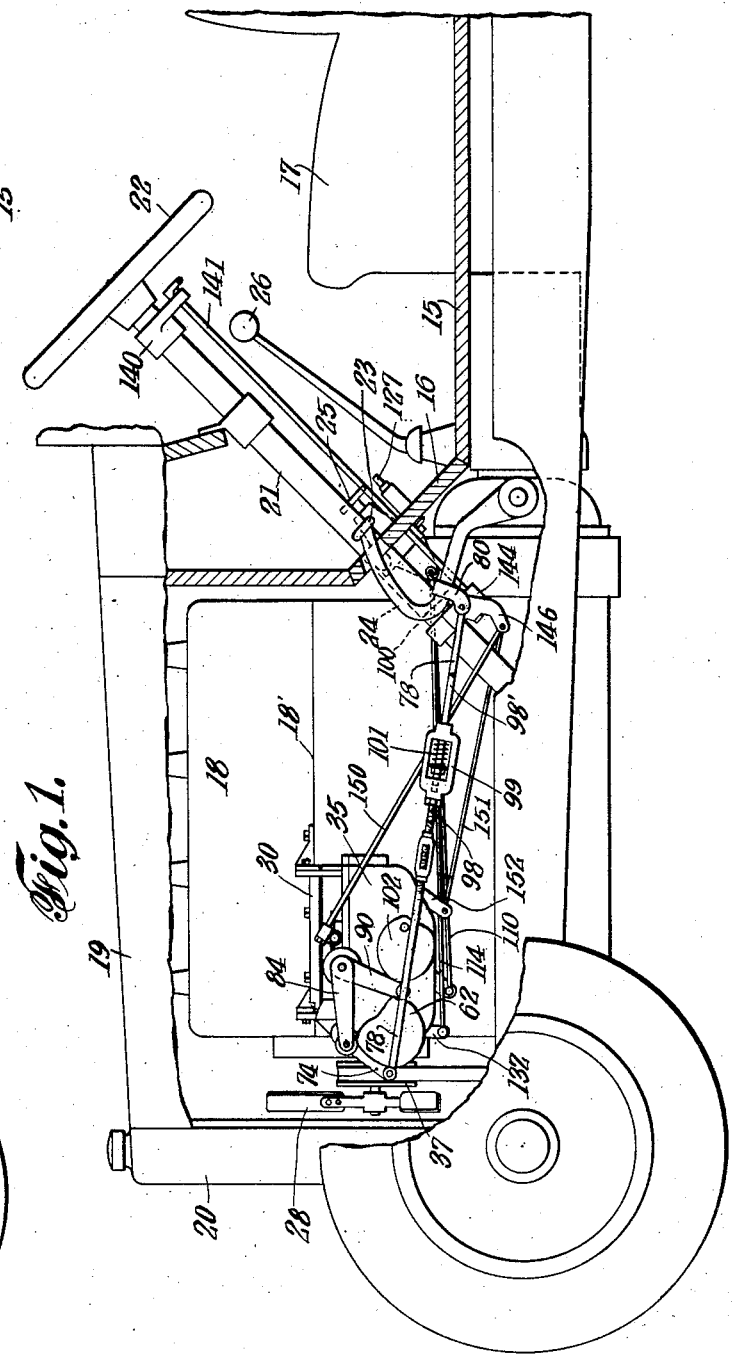
INVENTOR
*Anthony J. Vasselli*
BY
*Warren E. Willis,*
ATTORNEY

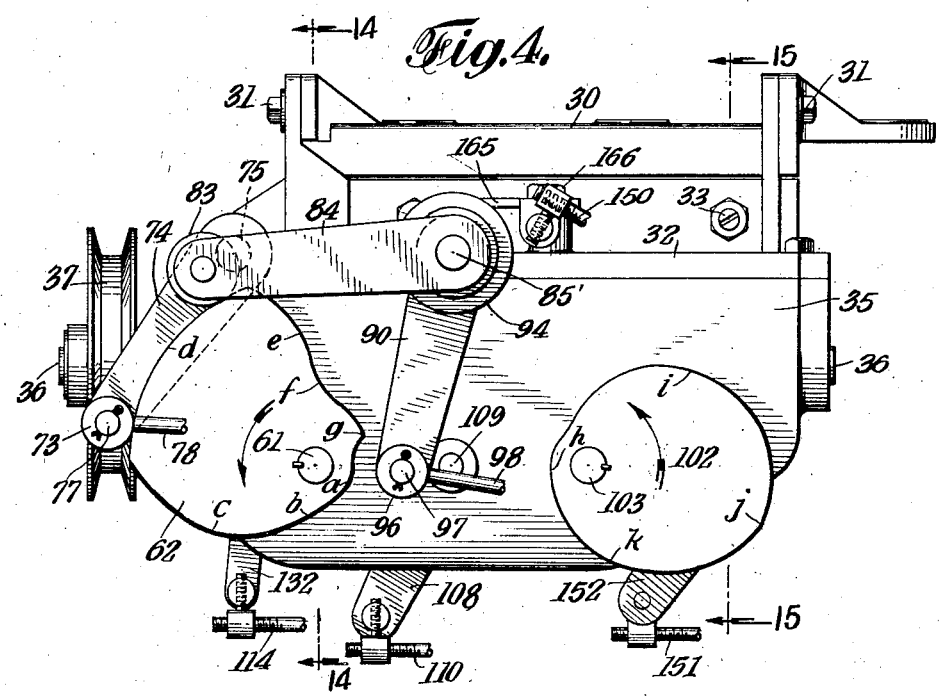
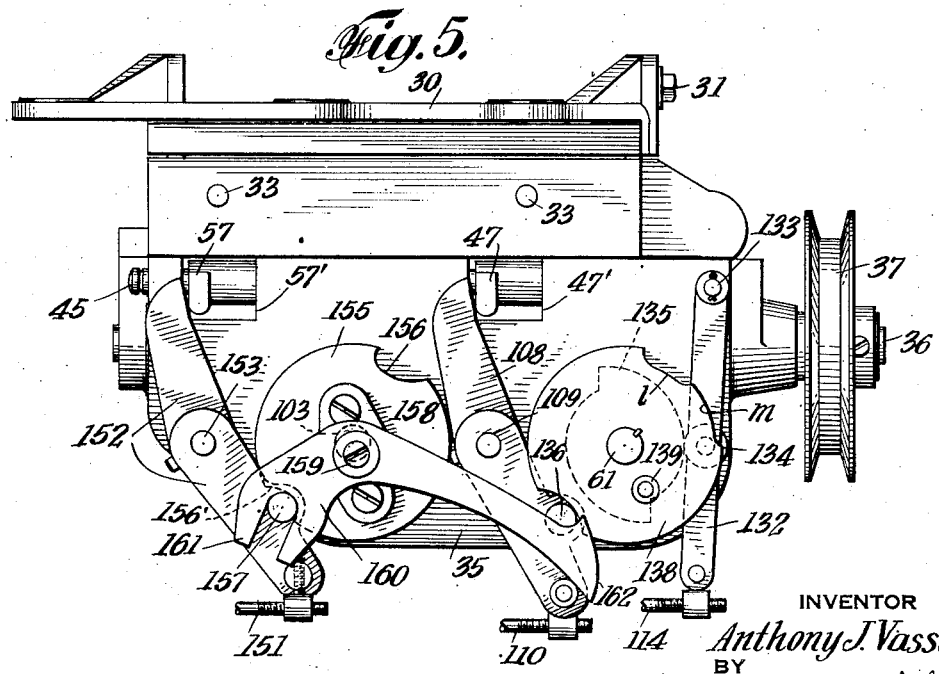

Sept. 26, 1933.  A. J. VASSELLI  1,928,143
AUTOMATIC POWER CLUTCH AND BRAKE CONTROL FOR VEHICLES
Filed Feb. 8, 1932  5 Sheets-Sheet 3

INVENTOR
Anthony J. Vasselli
BY
Warren E. Willis.
ATTORNEY

Sept. 26, 1933.   A. J. VASSELLI   1,928,143
AUTOMATIC POWER CLUTCH AND BRAKE CONTROL FOR VEHICLES
Filed Feb. 8, 1932   5 Sheets-Sheet 4
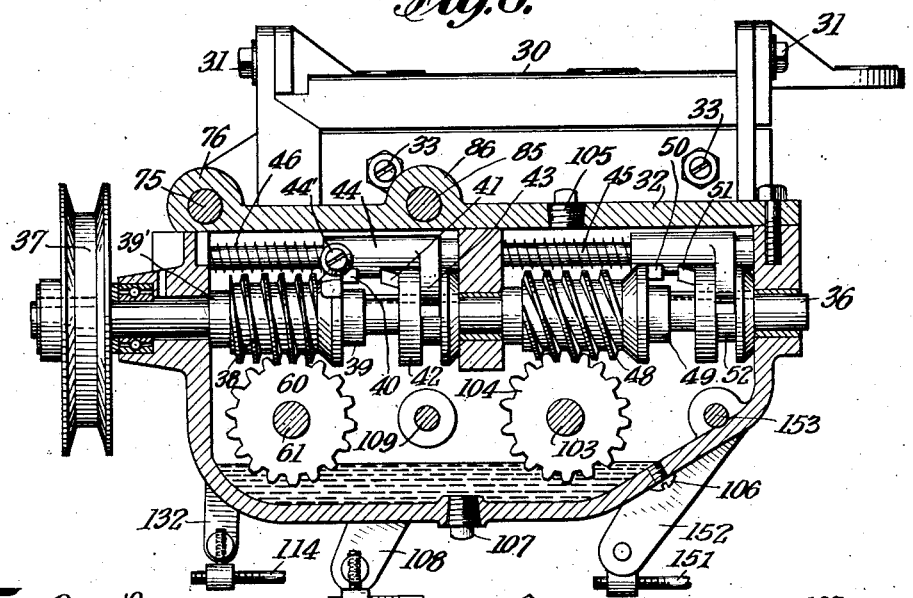
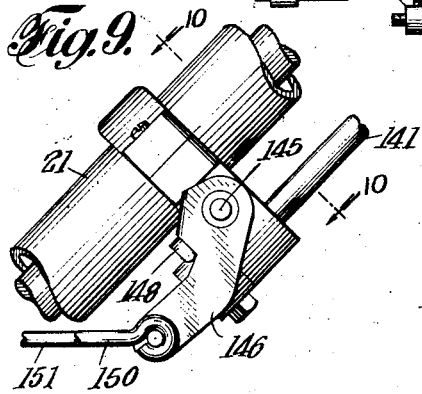
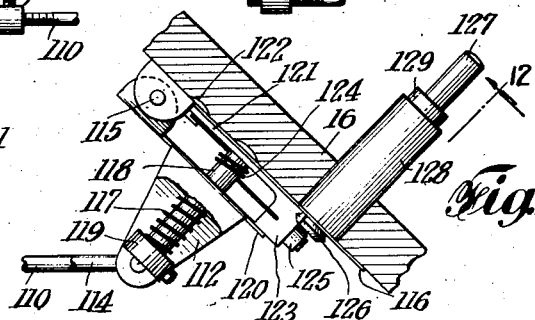
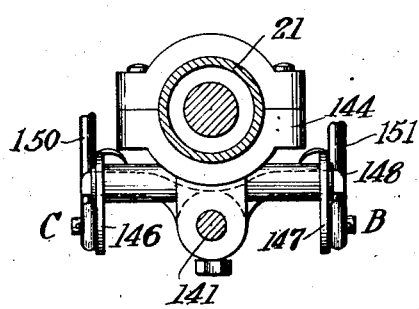
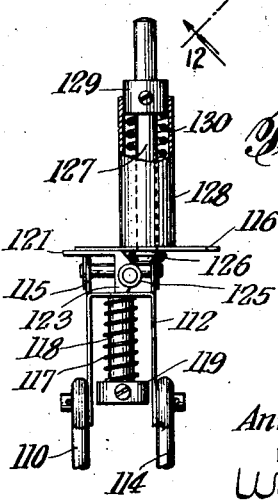
INVENTOR
Anthony J. Vasselli
BY
Warren E. Willis,
ATTORNEY Sept. 26, 1933.   A. J. VASSELLI   1,928,143
AUTOMATIC POWER CLUTCH AND BRAKE CONTROL FOR VEHICLES
Filed Feb. 8, 1932   5 Sheets-Sheet 5
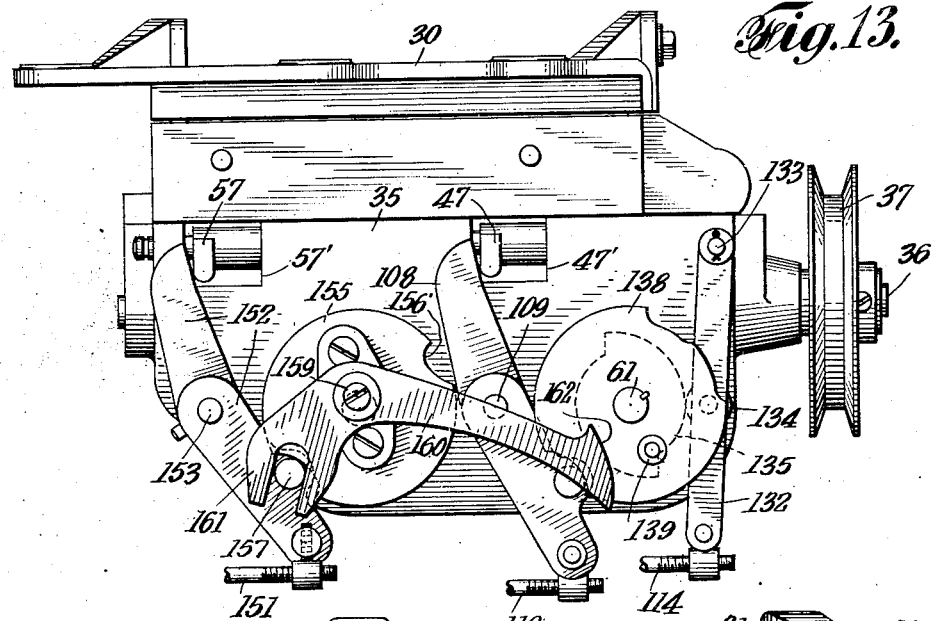
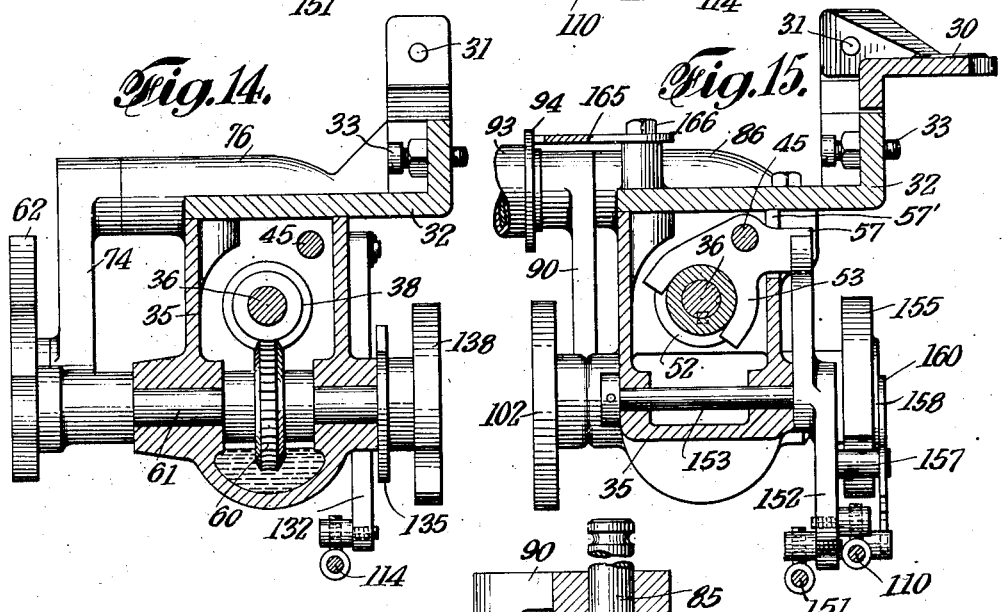
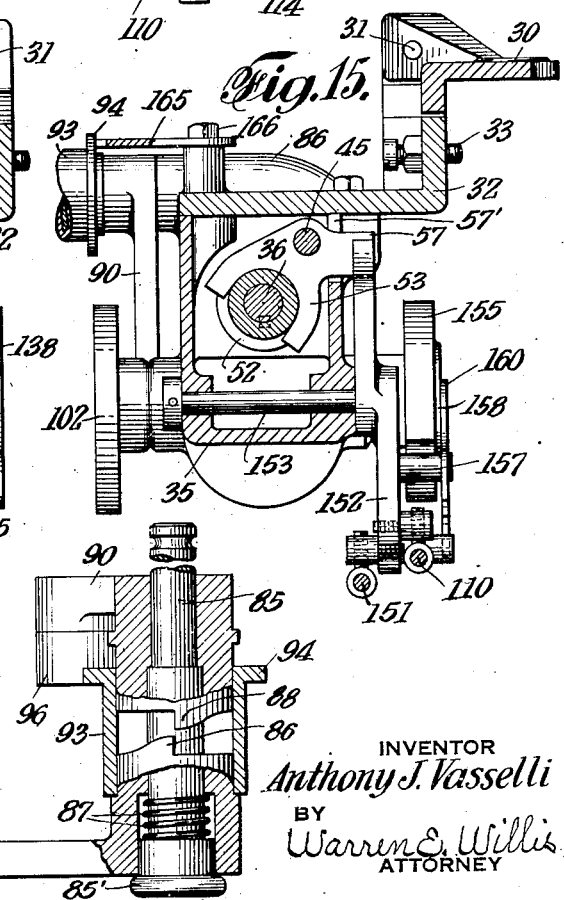
INVENTOR
Anthony J. Vasselli
BY
Warren E. Willis
ATTORNEY Patented Sept. 26, 1933

1,928,143

UNITED STATES PATENT OFFICE 1,928,143

AUTOMATIC POWER CLUTCH AND BRAKE CONTROL FOR VEHICLES

Anthony J. Vasselli, Newark, N. J.

Application February 8, 1932. Serial No. 591,516

22 Claims. (Cl. 192—13)

This invention has reference to an automatic mechanism for operating the brake and clutch devices of motor vehicles, being an improvement on my co-pending application for "brake and clutch control for motor vehicles", filed April 21, 1931, Serial No. 531,731, and patent on "automatic brake and clutch control for automobiles", issued September 16, 1930, and numbered 1,775,978.

One of the objects of the present invention is to provide means actuated by the crank shaft of the motor, whereby, upon removal or relaxation of the foot from the gas throttle control pedal, the transmission clutch will not only be released, but the brakes will be automatically applied in a smooth, instant and effective manner without action or effort on the part of the operator, who is thus insured against damage caused by fatigue, faintness or other disability.

A further feature is in the provision of means whereby the condition of free wheeling is readily attained at will.

Another aim is to produce a small compact mechanism directly engaged with the motor casing and utilizing the power of the motor for its actuation.

These and other useful objects are accomplished by the novel and practical construction and combination of parts hereinafter described and illustrated in the appended drawings, forming a material part of this disclosure, and in which:—

Figure 1 is a partial side elevational view of a conventional type of motor vehicle, parts being broken away to show the control mechanism as positioned therein.

Figure 2 is a partial plan view of the steering wheel and hand control attachments.

Figure 3 is a fragmentary plan and sectional view showing the foot-board, pedals and associated parts.

Figure 4 is a front elevational view of the control mechanism and its casing.

Figure 5 is a rear elevational side view of the same.

Figure 8 is a longitudinal sectional view taken on line 8—8 of Fig. 6.

Figure 9 is a fragmentary side view of the steering post and bracket carried control attachment.

Figure 10 is a transverse sectional view taken on line 10—10 of Fig. 9.

Figure 11 is a side elevational view of the pedal actuated control device.

Figure 12 is a rear end view of the same looking on line 12—12 of Fig. 11.

Figure 13 is a rear side view of the device, similar to Fig. 5, but showing certain of the parts in another position.

Figure 14 is a transverse sectional view taken on line 14—14 of Fig. 4.

Figure 15 is a transverse sectional view taken on line 15—15 of Fig. 4.

Fig. 16 is a partial plan, partial sectional view of the brake control levers, seen in Fig. 4, drawn to an enlarged scale, their hubs being separated from the position seen in Fig. 6.

Figure 6:
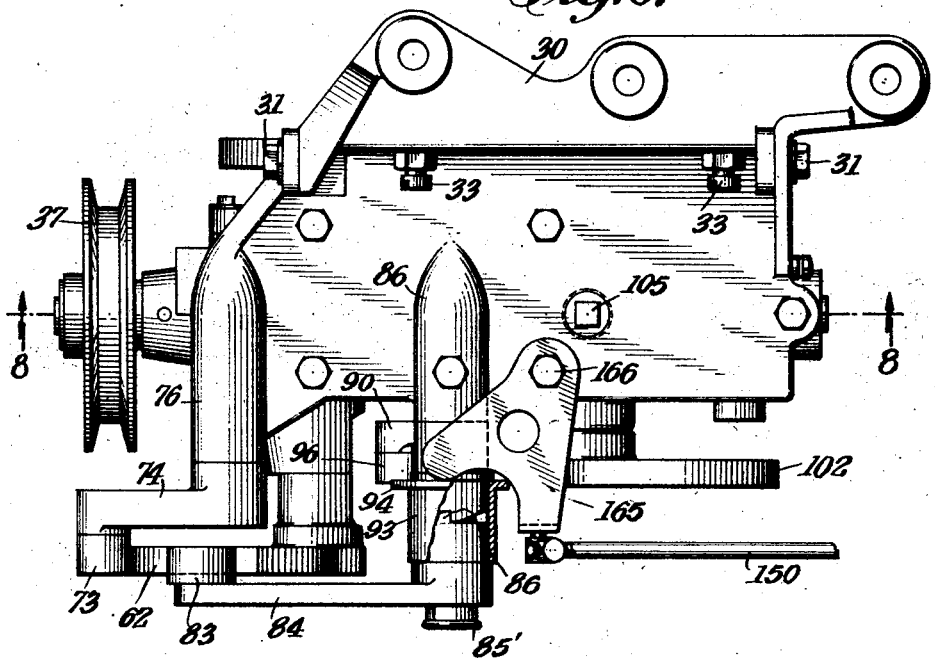
Figure 6 is a top plan view of the device.

An embodiment of the invention is shown as attached to an ordinary type of automobile in Figure 1, in which is indicated a flooring 15, foot-board 16, seat 17, motor housing 18, hood 19, radiator 20, steering post 21, steering wheel 22, clutch and brake pedals respectively 23 and 24, accelerator or gas throttle 25 and gear shift lever 26, together with the other usual and necessary parts.

Rigidly secured to a horizontal ledge 18' on the side of the motor housing is a bracket 30 having a pair of opposed, widely spaced lugs carrying pivot screws 31 by which is hingedly attached the raised ears of a cover 32, the cover having an upstanding flange at its rear edge provided with screws 33 impinging against the motor housing and by which the cover and casing 35 may be swung on the pivots relative to the motor housing for the purpose of adjustment.

The crank shaft of the motor may have on its front end a double faced pulley, one portion of which is belt connected to drive a fan 28, adjacent the radiator 20.

The casing 35 is provided at its end, and also approximately at the center of its length, with bearings to receive a shaft 36 having keyed at its forward end a pulley 37 alined with the pulley on the crank shaft to be driven by a belt therefrom, the tension of which is controlled by the screws 33 acting to adjust the lateral distance between the motor crank shaft and mechanism shaft 36, these shafts being at all times parallel. It is to be understood that any other suitable driving connection between the motor crank shaft and mechanism shaft 36 may be substituted for the foregoing.

Freely revoluble on the shaft 36, within the front portion of the casing 35, see Fig. 8, is a single pitch worm 38 held between collars 39—39' fixed to the shaft, the inner, rear end of the worm being formed to present one of the elements 40 of a positive drive clutch.

The mating element 41 of the clutch is formed on a grooved annulus 42 slidable on the shaft between the center bearing of the shaft and the collar 39 on a key fixed in the shaft.

Motion is communicated to the clutch annulus by a fork 43 formed on a sleeve 44, slidable on a rod 45 held in the casing 35 parallel with the shaft, and projected rearwardly under normal conditions by a light compression spring 46 encircling the rod, tending to maintain the clutch elements apart, the teeth of both clutch elements being bevelled on their engaging faces operating to press the annulus away from the worm except when held in operative position by the fork.

An arm 47 extends from the clutch fork outwardly through an opening 47' in the rear side wall of the casing 35, the purpose of which will be later described.

In a similar manner a double pitch worm 48 is mounted freely between fixed collars 49—49' on the shaft 36 and provided with a clutch element 50 engageable by a mating element 51 on an annulus 52 controllably slidable on a key set in the shaft between the collar 49 and the rear end bearing of the shaft, by a fork 53 having a sleeve 54 slidable on the rod 45 and pressed away from the worm by a spring 56; as in the previous case an arm 57 of the fork 53 projects through an opening 57' in the rear wall of the control mechanism casing.

Figure 7:
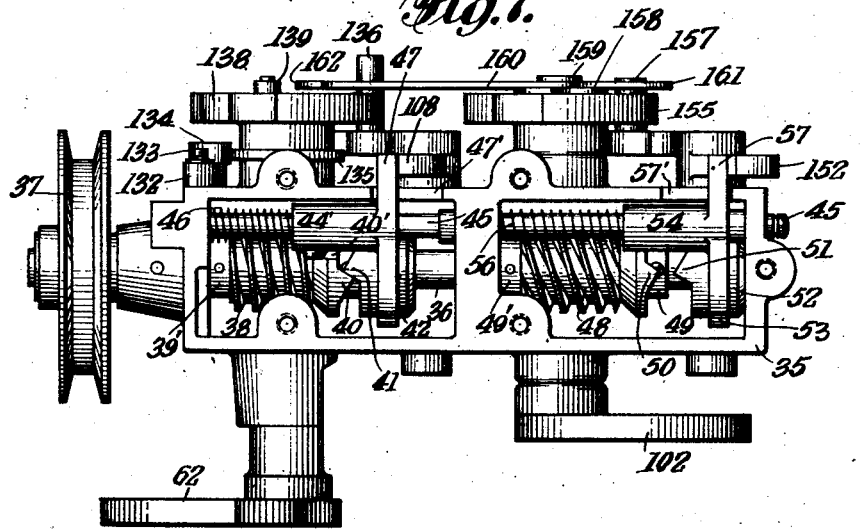
Figure 7 is a similar view of the same with the casing cover and attached parts removed.

The circular portion of the clutch element 40, see Fig. 7, contains a recess 40' in its circumferential edge to receive a lug 44' on the clutch fork sleeve when the worm is unclutched and effectually prevents the worm from rotating on the shaft 36 by frictional contact and thus interfering with the timing of other instrumentalities as will later be seen.

Meshed with the worm 38, (see Fig. 8) is a worm gear 60, fixed on a spindle 61, rotatably mounted transversely in the casing 35, below the shaft 36 and having keyed to its front extending end, see Fig. 4, a profile cam 62 shaped to present a short dwell $a$ of minimum radius, a quick rise $b$ intensified at $c$, a long dwell $d$ of maximum radius, and a quick drop $e$ blending into a more gradual drop $f$, completing at $g$ the descent to $a$.

A roll 73 is engaged by the cam, the roll being carried on the free end of a lever 74 pivoted on a spindle 75 fixedly mounted in a boss 76 on the casing cover 32.

The pivot pin 77, on which the cam roll 73 is carried, is also connected to the front end of a rod 78 having its rear end engaged in a socket 80 fixed on the clutch pedal lever 23, thus providing means for releasing the clutch by either the cam or foot lever, each being independently operative.

Another roll 83 is actuated by the cam 62, in advance of the roll 73, the roll 83 being carried at the free end of a lever 84 pivoted on a spindle 85 rigidly mounted in a boss 86 on the cover, rearward of and in register with the axis of the lever 74.

The spindle 85 has an enlarged head 85' to retain the lever 84, which is both rotatably and slidably mounted on the spindle, the hub of the lever being formed with ratchet teeth 86 pressed normally inward by a coiled compression spring 87, causing the lever to engage with corresponding teeth 88 on the hub of another lever 90 also rotatably mounted on the spindle 85.

A sleeve 93 encloses the ratchet teeth and inreaching hubs of the levers 84 and 90, preventing entrance of dirt therebetween.

The sleeve 93 is provided with an annular flange 94 at its inner end which abuts a shoulder on the hub of the lever 90 while the opposite end of the sleeve, when moved outwardly, makes contact with a similar shoulder on the hub of the lever 84 to press the lever along the spindle 85, causing separation of the ratchet teeth 86—88.

The lever 90 carries at its free end a roll 96, rotatable on a stud 97 which is also engaged with the end of a rod 98 fixed in one end of a spring shackle 99, having slidably engaged in its opposite end an alined rod 98', pressed inwardly by a strong compression spring 101 within the shackle to maintain a uniform pressure on the brakes, preventing them from slipping in the event the brake linings become wet, the rear end of the rod 98' being secured in a socket 100 fixed on the brake lever 24 (see Fig. 1).

Another profile cam 102 is fixed on the end of a spindle 103 mounted transversely in the casing 35, parallel and in the same plane with the spindle 61.

The cam 102 has a short dwell $h$ of minimum radius, a long rise $i$ to the highest point $j$ and then a gradual drop $k$ to the dwell $h$ and is arranged to a plane slightly closer to the casing 35 in order to clear the cam 62 and actuate the roll 96 with which it is in registration.

The spindle 103 has secured to it a worm gear 104 meshed with the double pitch worm 48 to be rotated when the worm clutch elements 50—51 are in engagement.

It is to be noted that the gears 60 and 104 are disposed in the lower part of the casing 35, to rotate partially in an oil bath therein, supplied through a filling plug 105 in the casing cover, any excess being drained by the plug 106 in the casing, or the contents completely drained by removing the plug 107 in the bottom of the casing, this arrangement affording thorough lubrication to the shaft bearings, worms, clutches and spindles in an obvious manner.

The single pitch worm 38 in the front portion of the casing is clutched to the shaft 36 by moving the clutch teeth 40—41 into engagement, accomplished by sliding the clutch fork forwardly on the rod 45, against the pressure of the spring 46, coincidently freeing the lug 44' from the recess in the circular portion of the worm.

The extending arm 47 of the clutch fork (see Fig. 5) is actuated by a lever 108, pivoted midway its length on a stud 109 set in the rear wall of the casing 35; the lower end of the lever is connected to the end of a rod 110 carried by one of the forked members of a U shaped bracket 112, the mating member of which is similarly engaged by a like rod 114 (see Figs. 11–12).

The inverted base of the bracket 112 is provided with an extension having ears connected by a pivot 115 to lugs reaching downwardly from the plate 116 secured to the footboard 16 of the vehicle.

The bracket is normally raised on its pivot by a compression spring 117 encircling the post 118 and seated on its head 119, the post being fixed in the plate 116 and passing freely through the transverse wall of the bracket; a continuation of this wall, opposite the pivot, constitutes a catch 120.

A swing plate 121 is pivoted at 122 to the main plate 116, adjacent to and in a plane transverse to the pivot 115, the swing plate having an opening to clear the post 118 which passes through it.

The free, front end of the plate 121 is raised to present a detent 123 to engage the catch 120 and is normally swung into engaging position by a torsional spring 124 disposed around the post.

Carried on the wall of the detent 123 is a small roll 125 engageable by a double bevel edged disc 126 fixed on the lower end of a plunger 127 slidably mounted in a tubular post 128 fixed rigidly on the opposite side of the plate 116 to extend through the foot-board 16 closely adjacent the accelerator 25, (see Fig. 3).

A collar 129, adjustably fixed on the plunger, is pressed normally upward by a compression spring 130 encircling the plunger within the post 128.

From the foregoing it will be seen that upon depression of the plunger 127, the disc 126 contacts the roll 125, displacing the detent 123 from under the catch 120, whereupon the spring 117 operates to move the bracket 112 on its pivot 115, drawing the rods 110 and 114 rearwardly.

As has been recited, the rod 110 actuates the lever 108, causing clutch engagement of the single pitch worm 38 with the constantly driven mechanism shaft 36 to rotate the cam 62, which in turn first sets the brakes and thereafter, without appreciable delay, releases the transmission clutch of the vehicle, which, under normal conditions of driving, is brought to a full stop, smoothly and without jar.

The other rod 114, attached to the bracket 112, meantime has drawn a connected lever 132, rearwardly, this lever being pivoted on a stud 133, set in the upper front corner of the rear wall of the casing, and carries a roll 134 impinging against the face of a double throw, symmetrical cam 135 fixed on the rear extending portion of the front spindle 61 (see Figs. 5 and 13).

The cam 135, at either of its high points, acts to draw the rod 114, forwardly, causing re-setting of the plunger operated device, in timed relation to the rotation of the cam 62, ready for further complete cycle of operation.

Fixed on the spindle 61, outwardly beyond the cam 135, is a cam disc 138 having minor and major peripheral depressions respectively $l$ and $m$; it also carries on its outer side a roll 139.

Mounted on the steering post 21 (see Figs. 1 and 2), is a bracket 140 in which is rotatably engaged a rod 141 having at its upper end opposed pull levers 142—143, disposed below and closely adjacent the hand wheel 22.

The lower portion of the rod 141, (see Figs. 9–10), which is spaced parallel with the steering post, passes through the foot-board 16 and is provided with another bearing bracket 144 clamped to the post.

Secured to the sides of the bracket 144, by a pivot 145, are plate levers 146 and 147 independently operable by a bar 148 adjustable fixed to the lower end of the rod 141 and offset inwardly in a plane directly below the axis of the pivot 145, the arrangement being such that either of the levers 146 or 147 may be swung rearwardly, by selective manipulation of the levers 142—143.

Connected to the plate lever 147 is a rod 151, its forwardly extending end being adjustably engaged in the free end of a lever 152, pivoted on a pin 153 set in the rear side wall of the casing, the opposite, operative upper end of the lever being so disposed as to actuate the fork arm 57 of the double pitch worm. (See Fig. 5.)

On the end of the spindle 103, extending through the rear wall of the casing 35, is mounted a disc 155 having in its periphery a pair of opposed notches 156—156' in which is engageable a roll 157 carried by the lever 152.

Fixed on the outer side of the disc 155 is a bracket 158 carrying an eccentrically disposed pivot 159 on which is mounted a lever 160 having at one end a fork 161 engaging the roll 157 and at the other, longer, forwardly extending end a cam face 162 contactable by the roll 139.

When the spindle 103 is rotated and the disc 155 carried by it, the axis of the pivot 159 is raised, due to its eccentricity, causing the lever 160 to turn on the roll 157, engaged in its fork, thus raising the cam end 162 of the lever into position shown in Fig. 13. Meanwhile the roll 96, (in Fig. 4) carried by the lever 90, is forced forwardly by the cam 102, which when clutched to the double pitch worm further advances the throw of the lever 90, beyond the stage attained by the cam 62 and consequently intensifying the pull on the brake control rod 98—98', stopping the vehicle instantly.

It is to be noted that this effect is attained by the lever 143, and in addition to the effect produced by release of the foot operated plunger 127, which is held normally depressed by the foot of the operator when actuating the accelerator 25.

In operation, if the pressure of the foot be relaxed from the accelerator, thus cutting off the supply of fuel, the plunger 127 rises, tripping the control bracket 112 and by reason of the rod 110 and lever 108, clutches the worm 38 to the shaft 36 thereby causing rotation of the cam 62, which, as has been noted, first sets the brakes and in immediate sequence releases the transmission clutch.

The action of the control bracket 112 also draws the rod 114 causing the lever carried roll 134 to be operated by the cam 135, which acts to reset the foot bracket control when the cam has made one half of a complete revolution.

If a rapid stop of the vehicle is desirable, the lever 143 is moved rearwardly, tilting the cross bar 148 to actuate the plate lever 147 and drawing the rod 150 to operate the cam lever 152, setting the cam 102 into operation, by means of which the lever 90 is operated and the brake rod 98—98' stressed, setting the brakes of the vehicle very speedily, due to the rapid speed of the cam 102 relative to the speed of the cam 62.

When it is desired to start the vehicle into motion it is necessary only to press the foot against the accelerator 25 and plunger 127 coincidently, causing the cam 62 and disc 138 to be rotated, bringing the roll 139 into operative engagement with the face 162 of the lever 160, see Fig. 13, causing it to swing on the pivot 159 and due to its fork engaging the roll 127, transmit motion to the lever 152, thus engaging the double pitch worm 48 with the shaft 36, thereby setting the cam 102 in operation to release the lever 90, which in turn releases the brake mechanism and coincidently moves the lever 132 forwardly to reset the foot control bracket 112.

When it is desirable to shift the transmission gears from 1st to 2nd, or 2nd to 3rd, or to put the vehicle into condition for free wheeling, it can be accomplished by pressing the lever 142, and releasing the foot operated plunger 127.

The mating rod of the controlled device is engaged with one of the arms of the lever 165, Fig. 6, pivoted at 166 on the casing cover 32, the other arm of the lever being so disposed as to contact the flange 94 of the sleeve 93, thereby to move the lever 84 outwardly, thus releasing its engagement with the lever 90 permitting the roll 83 to rest freely on the cam 62.

By releasing the plunger 127 only the clutch pedal is operated on account of the brakes being disconnected; the vehicle is now in condition for free wheeling and transmission gear shifting as may be desired.

By depressing the plunger 127 the clutch engages automatically and all other parts are restored to their initial position ready for further operation.

Although the foregoing describes in considerable detail the best known embodiment of the invention, together with the mode of application and operation, it will be understood that minor changes may be made without departing from the spirit of the invention as denoted by the appended claims.

Having thus described the invention, what is claimed as new and desired to secure by Letters Patent, is:—

1. In a motor vehicle having a crank shaft, a transmission clutch and brake system, mechanical means actuated by the vehicle motor to apply the brakes and to release the transmission clutch in sequence, pedal means for setting the actuating means in operation, and automatic means for restoring the actuating means to initial position.

2. In a motor vehicle having a crank shaft, a transmission clutch and brake system, mechanical means actuated by the vehicle motor to apply the brakes and to release the transmission clutch in sequence, pedal means for setting the actuating means in operation, means to intensify the brake setting means, and automatic means for restoring all of said actuating means to their initial position.

3. In a motor vehicle having a crank shaft, a transmission clutch and brake system, a mechanism shaft driven by said crank shaft, a cam, means to couple said cam with the driven shaft, means actuated by said cam to apply the brake system, and other means actuated by said cam progressively following the application of the brake system to release the transmission clutch.

4. In a motor vehicle having a crank shaft, a transmission and brake system, a mechanism shaft driven by said crank shaft, a cam, means to couple said cam with the driven shaft, means actuated by said cam to apply the brake system, means to release said transmission clutch, said means being actuated by the same cam subsequently to applying the brakes, a second cam, means to couple said second cam with the driven shaft, and means actuated by said second cam to intensify the applied brake system.

5. In a motor vehicle having a crank shaft, a transmission clutch and brake system, a mechanism shaft driven by said crank shaft, a first cam, a second cam, means to couple each cam independently with said driven shaft, brake setting means initially actuated by said first cam, clutch releasing means actuated by said first cam, and means for finally setting the brakes actuated by said second cam.

6. In a motor vehicle having a crank shaft, a transmission clutch and brake system, a casing hingedly attached to the motor housing, means to adjust said casing on its hinge relative to the housing, a shaft rotatable in said casing, driving connections between said shaft and the crank shaft, a worm free on said shaft, a spindle having a gear meshed with said worm, a cam on said spindle, means actuated by said cam to apply the brake system, other means operated later by said cam to release the transmission clutch, and foot operated means to releasably couple said worm to the shaft in said casing.

7. In a motor vehicle having a crank shaft, a transmission clutch and a brake system, a casing alongside the motor housing, a shaft in said casing driven by said crank shaft, a rod in the casing parallel to said shaft, a worm free on said shaft, a clutch annulus keyed to slide on the shaft, a fork slidable on said rod to cause clutch engagement of said worm and annulus, a spindle having geared connections with said worm, a cam fixed on said spindle, a lever actuated by said cam to apply the brake system, a second lever actuated by said cam to release the transmission clutch progressively thereafter, and foot operated means to shift said annulus thereby to clutch said worm to its shaft.

8. In a motor vehicle having a crank shaft, a transmission clutch and brake system, a casing alongside the motor housing, a shaft in said casing driven by said crank shaft, a rod in the casing parallel to said shaft, a worm free on said shaft, a clutch annulus keyed to slide on the shaft, a fork slidable on said rod to cause clutch engagement of said worm and annulus, a detent carried by said fork to prevent rotation of said worm when the clutch annulus is released, a spindle geared to said worm, said spindle having a cam, a pair of levers actuated in spaced relation to said cam, the first lever to be actuated applying the brakes and the second lever releasing the transmission clutch, and means on the foot board of the vehicle, operating conjunctively with the gas control pedal, to shift said clutch annulus into engagement with said worm.

9. In a motor vehicle having a crank shaft, a transmission clutch and brake system, a casing alongside the motor housing, a shaft in said casing driven by said crank shaft, a single and double pitch worm both freely mounted on said shaft, independent means for clutching either worm on the shaft, a spindle geared to each worm, means actuated by the single pitch worm to set the brakes initially and release the transmission clutch progressively thereafter, said means being pedally controlled, means actuated by the double pitch worm to intensify the brake setting means, and means to retain the first mentioned means in engagement during operation.

10. In a motor vehicle having a crank shaft, a transmission clutch and a brake system, a casing having a shaft therein driven by said crank shaft, a first and second worm free on said shaft, pedally actuated means to clutch the first worm to said shaft, means to clutch the second worm to the shaft, cams operatively connected to each of said worms, a lever connected to the brake system and operated by the first cam, a second lever connected to the transmission clutch and trailingly engaging the same cam, a third lever clutch connected to the second lever and operated by the second cam, and means to normally retain the first cam in initial position.

11. In a motor vehicle having a crank shaft, a transmission clutch and a brake system, a casing having a shaft therein driven by said crank shaft, a first and second worm free on said shaft, pedally actuated means to clutch the first worm to said shaft, means to clutch the second worm to the shaft, cams operatively connected to each of said worms, a lever connected to the brake system and operated by the first cam, a second lever connected to the transmission clutch and trailingly engaging the same cam, a third lever clutch connected to the first lever and operated by the second cam, means to normally retain the first cam in initial position, and means to reset the pedal actuating means.

12. In clutch and brake control devices for vehicles, a spring pressed bracket hinged to the underside of the vehicle foot board, said bracket having a catch, a detent pivoted to swing in a plane transverse to said bracket, means normally causing engagement of said detent with said catch, a spring raised plunger in said foot board, means carried by said plunger to displace said detent upon being depressed, and operative connections between said bracket and said control devices.

13. In clutch and brake control devices for vehicles, a bracket hinged to the underside of the vehicle foot board and spring pressed thereagainst, said bracket having a catch on its free end, a detent pivoted to swing in a plane transverse to said bracket, means normally causing engagement of said detent with said catch whereby it is held in a raised position, a spring pressed plunger extending through the foot board, means at the lower end of the plunger to displace said detent thereby to release said bracket, operative connections from said bracket to each of said control devices, and means to return said bracket to its initial position after operation.

14. In clutch and brake control devices for motor vehicles having a foot operated fuel control knob, said devices being operatively geared to the vehicle motor, a plunger adjacent said knob to be actuated coincidentally therewith, and means actuated by the depression of said plunger to operate the brake and clutch control devices in sequence.

15. In a clutch and brake control device for motor vehicles having a steering wheel, a rod supported parallel to the wheel post, opposed operated levers fixed to the upper end of said rod, a bracket at the lower end of said rod, plate levers spacedly pivoted in said bracket equally distanced from the rod, a bar fixed in offset relation to the bottom of said rod to contact both plate levers whereby either may be selectively actuated, and operative connections from said plate levers to said control devices.

16. In a clutch and brake control device for motor vehicles, a shaft rotated by the motor, worms free on said shaft to be clutched thereto, worm wheels engaged by said worms on spindles transverse to said shaft, a cam on each spindle, means actuated by said cams to control the clutch and brake devices, pedal means to cause coupling of one of said worms to said shaft, and means to control coupling of the other worm to the shaft.

17. In a motor vehicle having a crank shaft, a transmission clutch and brake system, a mechanism shaft driven by said crank shaft having a single and a double worm freely mounted thereon, controllable clutches for each worm, a cam operatively connected to the single worm, pedal means to couple the single worm to the shaft, means to couple the double worm to the shaft, means actuated by said cam to apply the brake system and progressively release the transmission clutch, and two cams operatively connected to the double worm, one of said last named cams operating to enhance the action of the first named cam and the other to reset said pedal means.

18. In a motor vehicle having a crank shaft, clutch and brake actuating connections, a lever for each connection, a single cam to operate both levers simultaneously, the brake lever operating in advance of the clutch lever, a shaft driven by said crank shaft to actuate said cam, and a foot releasable plunger to couple said cam with said shaft.

19. In transmission clutch and brake control devices for motor vehicles, a cam, controllable means actuated by the motor to drive said cam, means to retain said cam normally quiescent when in its initial position, a pair of levers engaging said cam, connections from one of said levers to the brake control device, a third lever having normal clutch engagement with the first lever, a second cam to actuate said third lever, and connections from said third lever to apply the brakes.

20. In transmission clutch and brake control devices for motor vehicles, a motor actuated shaft, a pair of cams driven thereby, levers actuated by said cams respectively to apply the brakes and to release said transmission clutch, independent pedal means to couple each cam with said shaft, a third cam to reset the pedal coupling means, a fourth cam to reset the manual coupling means, said third and fourth cams being driven by said shaft, and means to return all of said cams to their initial position after operation.

21. In a motor vehicle having a crank shaft, clutch and brake actuating connections, a lever for each connection, a single cam to operate both levers, a shaft driven by said crank shaft to operate said cams, and pedal means to couple said cam with said shaft.

22. In a motor vehicle having a crank shaft, clutch and brake control connections, and a foot operated fuel control knob, a lever for each of the clutch and brake connections, a single cam to operate both levers, the brake connection lever moving slightly in advance of the clutch connection lever, a mechanism shaft driven by said crank shaft to operate said cam, and a spring raised plunger to couple said cam with said mechanism shaft upon being depressed, said plunger being closely adjacent the fuel control knob and operated coincidently with it.

ANTHONY J. VASSELLI.